United States Patent
Prevey, III

(10) Patent No.: US 6,622,570 B1
(45) Date of Patent: Sep. 23, 2003

(54) METHOD FOR REDUCING TENSILE STRESS ZONES IN THE SURFACE OF A PART

(75) Inventor: Paul S. Prevey, III, Cincinnati, OH (US)

(73) Assignee: Surface Technology Holdings Ltd., Cincinnati, OH (US)

(*) Notice: Subject to any disclaimer, the term of this patent is extended or adjusted under 35 U.S.C. 154(b) by 0 days.

(21) Appl. No.: 09/516,327

(22) Filed: Mar. 1, 2000

(51) Int. Cl.$^7$ .................................................. G01N 3/08
(52) U.S. Cl. ............................................. 73/826; 72/75
(58) Field of Search .................... 73/11.02, 862.043, 73/826; 72/75, 379.6, 379.2; 29/90.01

(56) References Cited

U.S. PATENT DOCUMENTS

| | | | |
|---|---|---|---|
| 1,784,866 A | 12/1930 | Fahrenwald | |
| 3,494,013 A | 2/1970 | Gottschald | 29/90 |
| 3,770,595 A | 11/1973 | Gros et al. | 204/29 |
| 3,820,210 A | 6/1974 | Kalen | 29/90 |
| 4,118,846 A | 10/1978 | Korte | 29/90 |
| 4,132,098 A | 1/1979 | Culver et al. | 72/102 |
| 4,360,143 A | * 11/1982 | Beckman et al. | 228/155 |
| 4,509,351 A | 4/1985 | Rolin et al. | 72/19 |
| 4,565,081 A | 1/1986 | Massee | 72/19 |
| 4,821,388 A | 4/1989 | Okumura et al. | 29/159.01 |
| 4,947,668 A | 8/1990 | Ostertag | 72/75 |
| 5,099,558 A | 3/1992 | Wilson | 29/90.01 |
| 5,329,684 A | 7/1994 | Budet et al. | 29/90.01 |
| 5,522,706 A | 6/1996 | Mannava et al. | 416/215 |
| 5,525,429 A | 6/1996 | Mannava et al. | 428/610 |
| 5,643,055 A | * 7/1997 | Linzell | 451/36 |
| 5,666,841 A | 9/1997 | Seeger et al. | 72/110 |
| 5,826,453 A | * 10/1998 | Prevey, III | 72/75 |

FOREIGN PATENT DOCUMENTS

| | | |
|---|---|---|
| EP | 0041248 | 12/1981 |
| FR | 2662623 A1 | 5/1990 |
| JP | 62-292362 | 12/1987 |

OTHER PUBLICATIONS

*Tools For Roller Burnishing, Deep Rolling, Forming*, pub. by Cogsdill Tool Products, Inc. (1996).
*Wear*, by M. Fattoul, M.H. Blaxir and S.M. Serage, Elsevier Sequoia, vol. 127, pp. 125–127 (1988).
*The Measurement of Subsurface Residual Stress and Cold Working Distributions in Nickel Base Alloys*, by Paul S. Prevey, pub. ASM Conference Proceedings (1987).
*Classification of Metal–Burnishing Methods and Tools*, by Yu. G. Scneider, *Machines and Tooling*, vol. XL, No. 1 pp. 35–39 (1969).
*Statistical Analysis of the Effects of Ball Burnishing Parameters on Surface Haroness*, by. N.H. Loh, S.C. Tam, B. Miyazawa, Elsevier Sequola (1988).

* cited by examiner

Primary Examiner—Edward Lefkowitz
Assistant Examiner—Lilybett Martir
(74) Attorney, Agent, or Firm—Mark F. Smith; Smith Brandenburg Ltd.

(57) ABSTRACT

The present invention is a novel method for reducing tensile zones in the surface of a part comprising the steps of selecting a region of the part to be treated and programming a control unit of a burnishing apparatus to perform a burnishing operation, the burnishing operation being performed such that the density of burnishing and the magnitude of compression are varied to reduce the high tensile stress along the boundaries of the selected region. In a preferred embodiment of the invention the burnishing operation induces a deep layer of compression within the surface having associated cold working of less than about 5.0 percent.

11 Claims, 9 Drawing Sheets

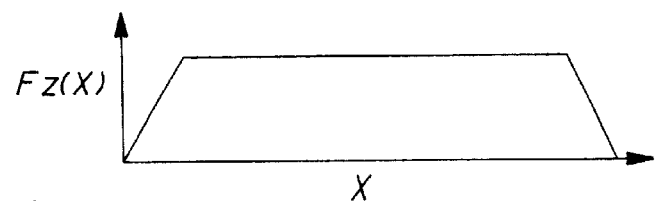
Fig. 4A
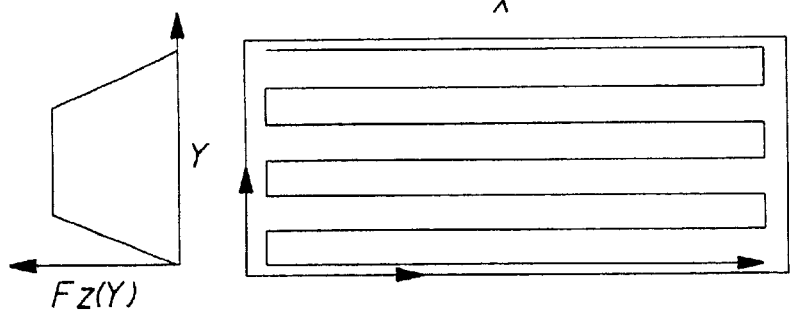
Fig. 4B
Fig. 4C
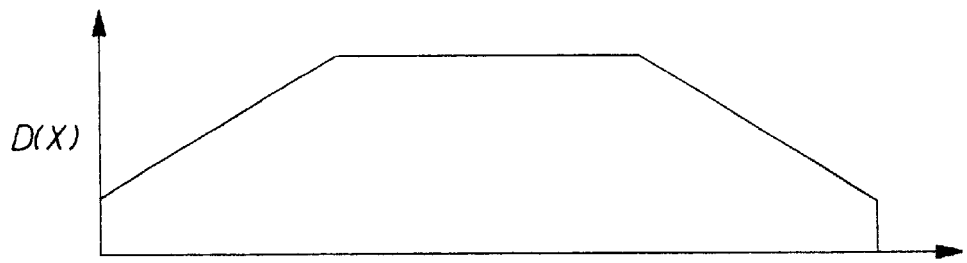
Fig. 5A
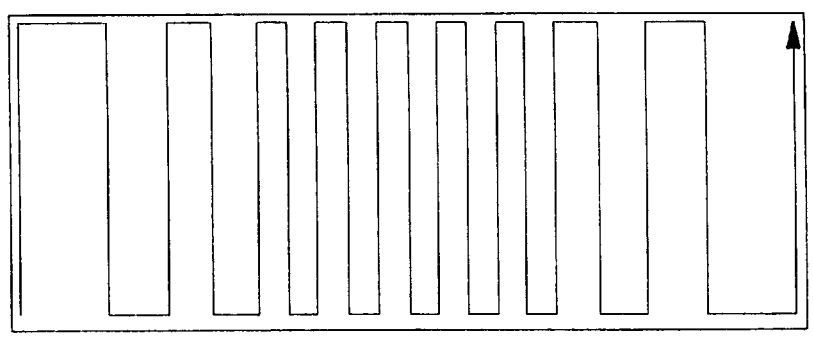
Fig. 5B

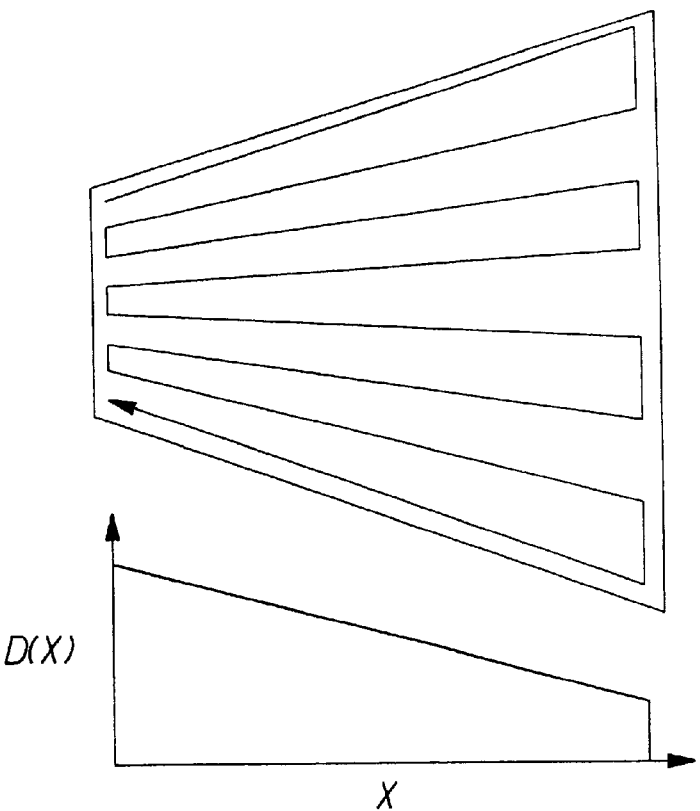
Fig. 6B
Fig. 6A
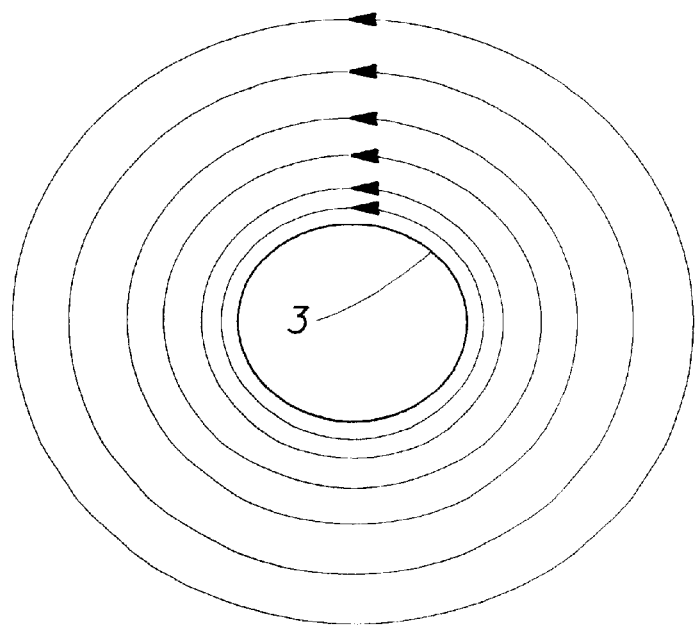
Fig. 7

4340 Steel LPB Coupon

METHOD FOR REDUCING TENSILE STRESS ZONES IN THE SURFACE OF A PART

RELATED PATENT APPLICATIONS

The present Application deals with related subject matter in co-pending U.S. patent application entitled METHOD AND APPARATUS FOR PROVIDING A RESIDUAL STRESS DISTRIBUTION IN THE SURFACE OF A PART, filed on the same day as the present application and having the same inventor in common.

BACKGROUND OF THE INVENTION

This invention relates to a method for reducing tensile stress zones in the surface of a part and, more particularly, to a method of reducing or eliminating tensile stress zones or concentrations within the surface of a part to improve fatigue and stress corrosion performance of the part and an apparatus for implementing the method.

Surface residual stresses are known to have a major effect upon the fatigue and stress corrosion performance of component parts. Tensile residual stresses, which can develop during manufacturing processes such as grinding, turning, or welding are well known to reduce both fatigue life and increase sensitivity to corrosion-fatigue and stress corrosion cracking of the part. Further, many parts that are subjected to high dynamic stresses or have areas where stress concentrations occur, such as blades and the rotor disks of turbo machinery, are prone to crack initiation and relatively rapid crack growth. The blades typically comprise an airfoil portion, a platform for partially defining a surface for fluid flow there over when the blade is mounted to the rotor disk, and a root portion having retention grooves which engage in corresponding axially extending complementary grooves of the disk. During engine operation, the rotor disk and the blade are subjected to large centrifugal loads that produce high dynamic stresses that may cause high cycle fatigue along portions of the rotor disk and the blade causing cracking and possible failure of the part. Further, the leading edge of the airfoil is often subjected to damage caused by the impact of foreign objects in the fluid stream. Such impact often results in cracks forming along the leading edge that may result in failure of the blade.

It is well known that compressive residual stresses induced in the surface of a part can increase fatigue life and reduce susceptibility to corrosion-fatigue and stress corrosion cracking. There are currently several methods used in industry for inducing compressive stress in the surface of a metal part and the particular method selected has been dependent on factors such as the dimensions and shape of the part, its strength and stiffness, the desired quality of the finished surface, the desired physical properties of the finished part, and the expense of performing the operation.

One method commonly used in industry to induce compressive stress in the surface of a part is shot peening, whereby a plurality of metallic or ceramic pellets are projected mechanically or through air pressure to impinge the surface of the part. While such a method is relatively inexpensive and is preferred for many applications, shot peening is unacceptable for parts requiring a superior finish or requiring a greater depth of compressive stress penetration and has also been found to be unacceptable for parts requiring localized or well defined compressive stress regions. Further, for parts such as a rotor disk for use in turbo machinery, the bore surfaces of the rotor disk are subjected to low levels of plastic strain (typically between about 0.2% to about 0.5%) when the rotor disk is accelerated to full speed. If the surfaces have been highly cold worked, such as during shot peening, the cold worked compressive surface material will not yield in tension while the lower yield strength interior material will yield during engine operation. On unloading, such as when the rotor speed is reduced, the surface is driven into tension and will remain in tension, reducing its fatigue life, for the remaining life of the component.

Another method commonly used in industry to induce compressive stress in the surface of a part is laser shock peening, whereby multiple radiation pulses from high power pulsed lasers produce shock waves on the surface of the part to produce a high magnitude localized compressive stress within a particular region. Unfortunately, however, laser shock peening is relatively expensive and time consuming making it unacceptable for many applications.

A method which have been developed and is widely used in industry to improve surface finish, fatigue life, and corrosion resistance by deforming the surface of a part is burnishing whereby a rotary or sliding burnishing member is pressed against the surface of the part in order to compress the microscopic peaks in the surface into adjacent hollows. Burnishing operates to develop compressive stresses within the part by yielding the surface in tension so that it returns to a state of compression following deformation.

The burnishing apparatus utilized for working the surface of a part typically comprise a plurality of cylindrical rollers or balls which contact the surface of the part with sufficient pressure to induce a compressive stress therein. The introduction of a region of high compressive residual stress will necessarily require tensile stresses elsewhere in the part to achieve equilibrium. Equilibrium only requires that the sum of all the normal stresses and moments acting on any plane through the entire part sum be zero. Unfortunately, sharp surface demarcation typically exists along the boundaries of the burnished area. It has been found that depending upon the geometry and stress filed, tensile residual stresses are often formed along such boundaries. As disclosed herein, it has been found that gradually reducing the pressure being exerted by the burnishing member to reduce the magnitude of compression at the boundaries will reduce the build up of tensile residual stress. Further, it has been found that by controlling the compressive residual stress distribution and the magnitude of compression, the tensile stress distributions within a part may be offset or distributed in such a manner as to optimize the fatigue and/or stress corrosion performance of the part. Until now, however, a method and apparatus have not been developed that permitted the residual stress distributions and the magnitude of compression to be controlled in such a manner as to optimize fatigue performance for a specific applied stress distribution.

Consequently, a need exists for a relatively inexpensive, relatively time efficient method and apparatus for implementing the method for improving the physical properties of a part by inducing a layer of compressive stress in the surface of the part, which is effective for use with complex shaped surfaces, and which permits the magnitude of compression and the residual stress distributions to be produced on a surface to achieve optimum fatigue performance and stress corrosion performance of the part.

SUMMARY OF THE INVENTION

The novel method of the present invention for reducing or eliminating tensile stress zones or concentrations immediately adjacent and parallel to the boundaries of compressive zones produced by a surface enhancement operation comprising the steps of selecting a region of the part to be treated and performing an operation of inducing a layer of compressive stress within the surface such that the magnitude of compression is reduced in the direction towards the boundaries of the compressive zones.

In another preferred embodiment of the invention, the step of exerting pressure against the surface of the selected region included performing a burnishing operation using a burnishing apparatus having a burnishing member for exerting pressure against the surface of the selected region of the part to produce a zone of deformation having a deep layer of compression.

In another preferred embodiment of the invention, the pressure being exerted on the surface of the part induces a deep layer of compression within the surface having associated cold working of less than about 5.0%.

In another preferred embodiment of the invention, the pressure being exerted on the surface of the part induces a deep layer of compression within the surface having associated cold working of less than about 3.5%.

In another preferred embodiment of the invention, whereby the step of exerting pressure on the surface of the part is performed by a burnishing operation using a burnishing apparatus having a burnishing member for exerting pressure against the surface of the selected region to induce a deep layer of compression within the surface having associated cold working of less than about 5.0 percent.

In another preferred embodiment of the invention, whereby the step of exerting pressure on the surface of the part is performed by a burnishing operation using a burnishing apparatus having a burnishing member for exerting pressure against the surface of the selected region to induce a deep layer of compression within the surface having associated cold working of less than about 3.5 percent.

In another preferred embodiment of the invention, whereby the selected pattern operates to vary the spacing between the zones of deformation to produce the desired residual stress distribution.

In another preferred embodiment of the invention, the step of selecting the magnitude of compression includes the step of programming a control unit to automatically adjust the pressure being exerted against the surface of the part.

In another preferred embodiment of the invention, the step of exerting pressure against the surface of the selected region includes performing a burnishing operation and the step of programming a control unit to control the direction of movement of a burnishing member to produce the desired stress distribution.

In another preferred embodiment of the present invention the step of varying the pressure being exerted against the surface of a part includes the steps of programming a control unit to adjust the pressure being exerted by a burnishing member against the surface of the part, and programming the control unit to direct the burnishing member over the part in a selected pattern to obtain the desired residual stress distribution.

In another preferred embodiment of the present invention, the step of varying the pressure being exerted against the surface of a part includes the step of gradually varying the magnitude of compressive stress in the areas immediately adjacent to the boundaries of the selected region.

The novel apparatus for implementing the method of the present invention utilizes a burnishing process for inducing a layer of compressive residual stress having a preselected magnitude of compression and a desired stress distribution. In particular, the burnishing apparatus comprises a burnishing member for applying pressure against the surface of the selected region of the part to produce a zone of deformation having a deep layer of compression and a preselected magnitude within the surface. The burnishing apparatus further comprises means for moving the burnishing member in a predetermined pattern across the selected region to produce a desired residual stress distribution.

In another preferred embodiment of the invention the burnishing apparatus for implementing the burnishing method of the subject invention comprises a burnishing member for applying pressure against the surface of a part to induce a layer of compressive stress therein; means for adjusting the pressure being applied against the surface of the part by the burnishing member; and means for directing the burnishing member over the surface of the part in a predetermined pattern to provide the desired residual stress distribution.

In another preferred embodiment of the invention, the burnishing apparatus for implementing the burnishing method of the subject invention is coupled to a control unit for automatically controlling the movement, position, and application pressure of the burnishing member.

In another preferred embodiment of the invention, the burnishing apparatus for implementing the burnishing method of the subject invention comprises means for supplying a constant flow of fluid to support the burnishing member.

In another preferred embodiment of the invention, the burnishing apparatus for implementing the burnishing method of the subject invention comprises magnetic means for maintaining the burnishing member within the socket.

Another preferred embodiment of the invention is a blade for use in turbo machinery having a desired stress distribution.

Another preferred embodiment of the invention, a part selected from the group consisting of automotive parts, aircraft parts, marine parts, engine parts, motor parts, machine parts, drilling parts, construction parts, pump parts, and the like comprises regions of compressive residual stresses having predetermined stress distributions.

Another preferred embodiment of the invention, a part selected from the group consisting of automotive parts, aircraft parts, marine parts, engine parts, motor parts, machine parts, drilling parts, construction parts, pump parts, and the like treated by the method comprising the step, or a combination of steps, of the present invention.

A primary object of this invention, therefore, is to provide a method and an apparatus for implementing the method of providing a part with an improved finish and with improved physical properties.

Another primary object of this invention is to provide a method and an apparatus for implementing the method of inducing a compressive stress layer on the surface of a part.

Another primary object of this invention is to provide a method and an apparatus for implementing the method of inducing a compressive stress layer that varies in magnitude of compression across the part in a predetermined pattern.

Another primary object of this invention is to provide a method and an apparatus for implementing the method of inducing a compressive stress layer having a well defined stress distribution.

Another primary object of this invention is to provide a method and an apparatus for implementing the method of inducing a compressive stress layer having a predetermined stress distribution.

Another primary object of this invention is to provide a method for forming a part having deep compression with a minimal amount of cold working and surface hardening.

Another primary object of the invention is to provide a burnishing apparatus that permits the pressure being exerted on the surface of a part to be varied to produce regions having residual stress distributions of arbitrary shape and magnitude of.compression.

Another primary object of this invention is to provide an apparatus having a burnishing member within a socket which can be easily removed and inserted into place within the socket.

Another primary object of this invention is to provide a method and an apparatus for implementing the method of inducing a compressive stress layer on the surface of a part which is relatively inexpensive.

Another primary object of this invention is to provide a blade for use in turbo machinery comprising regions of compressive residual stresses having predetermined stress distributions.

Another primary object of this invention is to provide a blade for use in turbo machinery having a compressive stress layer that varies in magnitude of compression across the part.

Another primary object of this invention is to provide a disk for use in turbo machinery comprising regions of compressive residual stresses having predetermined patterns of magnitude of compression and residual stress distribution.

Another primary object of this invention is to provide a part selected from the group consisting of automotive parts, aircraft parts, marine parts, engine parts, motor parts, machine parts, drilling parts, construction parts, pump parts, and the like comprising regions of compressive residual stresses having predetermined patterns of magnitude of compression and residual stress distributions.

These and other objects and advantages of the invention will be apparent from the following description, the accompanying drawings and the appended claims.

BRIEF DESCRIPTION OF THE DRAWINGS

FIG, 1 is a schematic block diagram illustrating the method of the present invention;

FIG. 4 is a schematic view of a generally rectangular region being treated by the method and apparatus of the invention for inducing a desired residual stress distribution and magnitude of compression whereby the pressure being exerted (force normal to the surface) against the surface is varied in two directions;

FIG. 5 is a schematic view of another region being treated by the method and apparatus of the invention for inducing a desired residual stress distribution and. magnitude of compression whereby the density of the burnishing pattern is varied in the one direction;

FIG. 6 is a schematic view of another region being treated by the method and apparatus of the invention for inducing a desired residual stress distribution and magnitude of compression whereby the density of the burnishing pattern is varied in the two directions.;

FIG. 7 is a schematic view of another region being treated by the method and apparatus of the invention for inducing a desired residual stress distribution and magnitude of compression, such as around a bolt hole, whereby the pattern is a symmetrical pattern;

DETAILED DESCRIPTION OF THE PREFERRED EMBODIMENT

Figure 1:
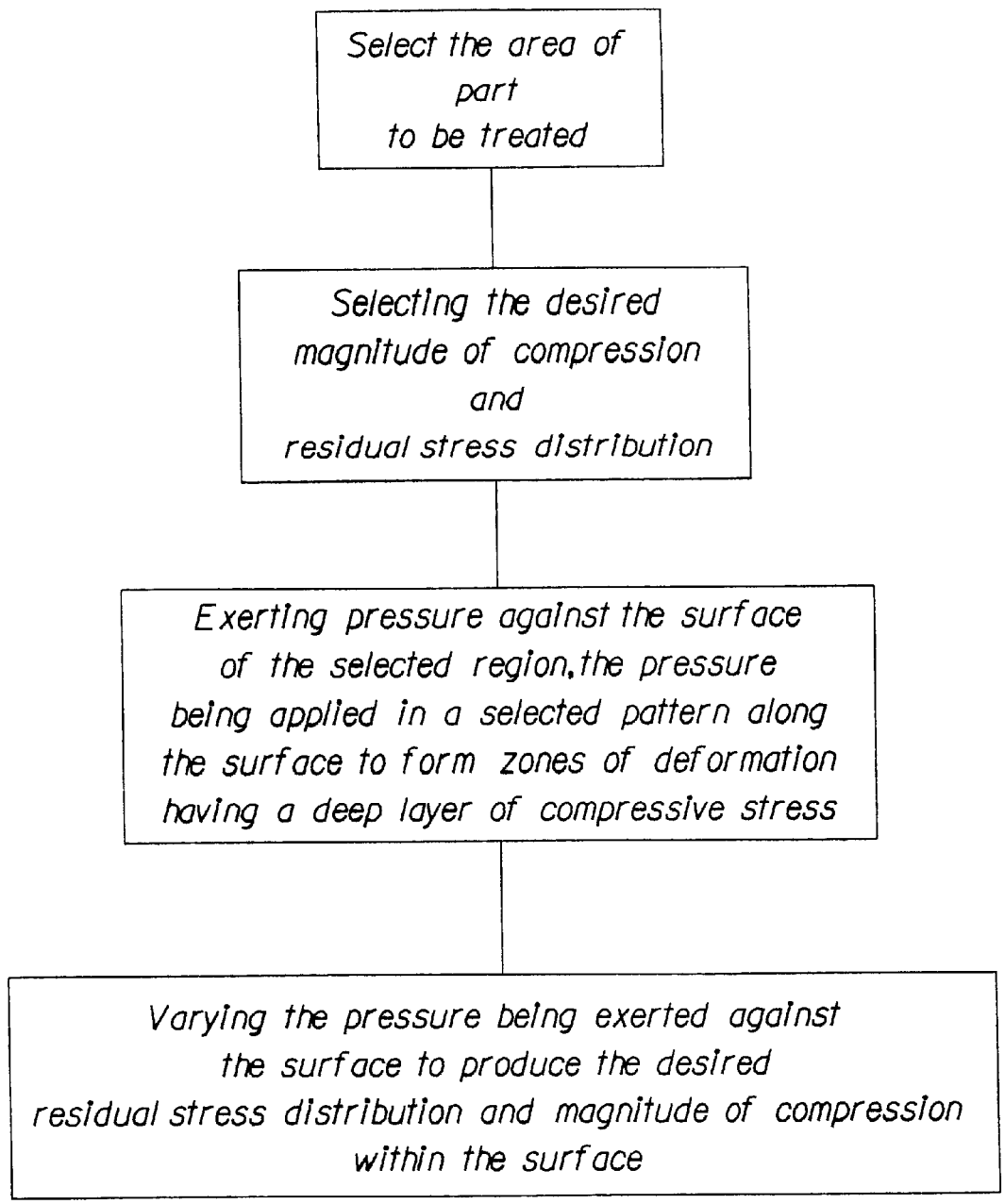

The present invention relates to a method and an apparatus for implementing the method of inducing a layer of compressive residual stress along the surface of a part. In a preferred embodiment of the invention, as shown in FIG. 1, the method of the present invention comprises the steps of selecting a region of the part to be treated; selecting the magnitude of compression and the residual stress distribution to be induced along the surface of the selected region, such as for example by finite element analysis; and inducing a layer of compressive residual stress along the surface of the selected region having the desired magnitude of compression and stress distribution.

Figure 2:
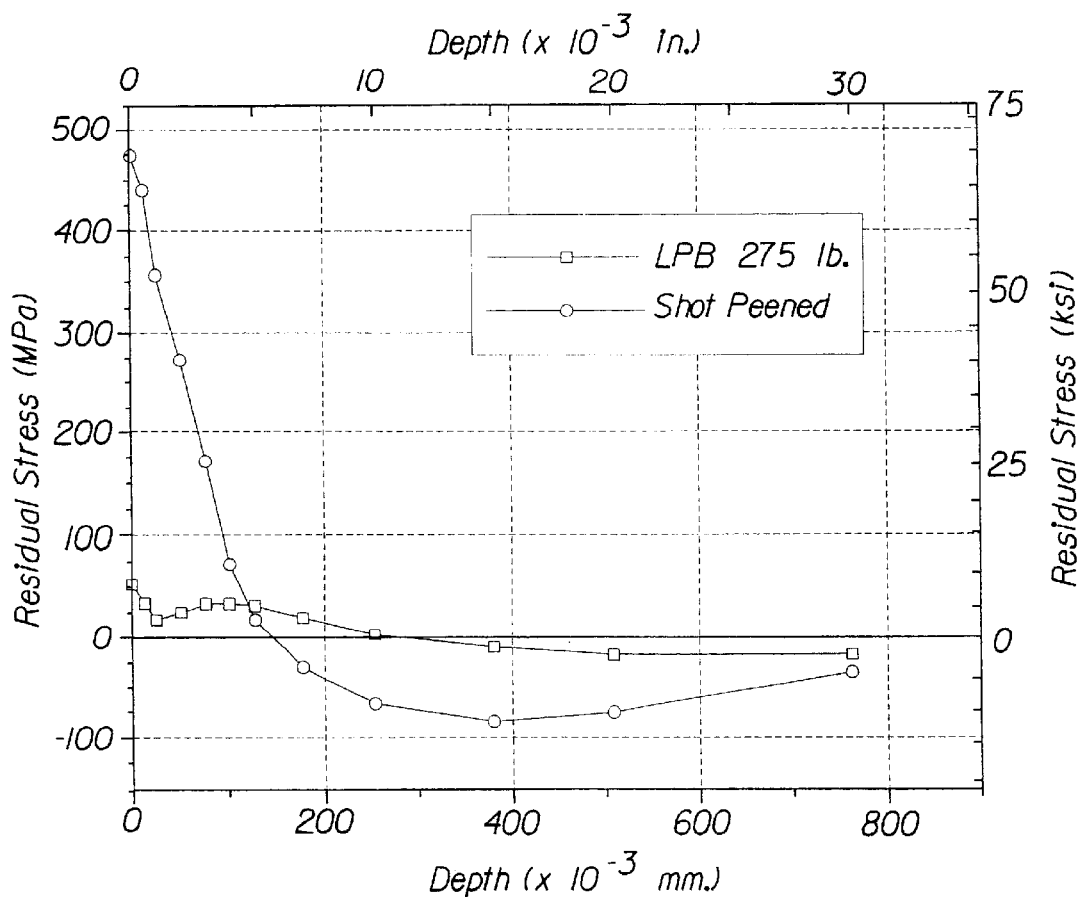
FIG. 2 is a graph illustrating the predicted longitudinal residual stress distribution, following 2.1% plastic strain, of a part having been treated by the method of shot peening and a part having been treated by the method of burnishing.
Figure 3:
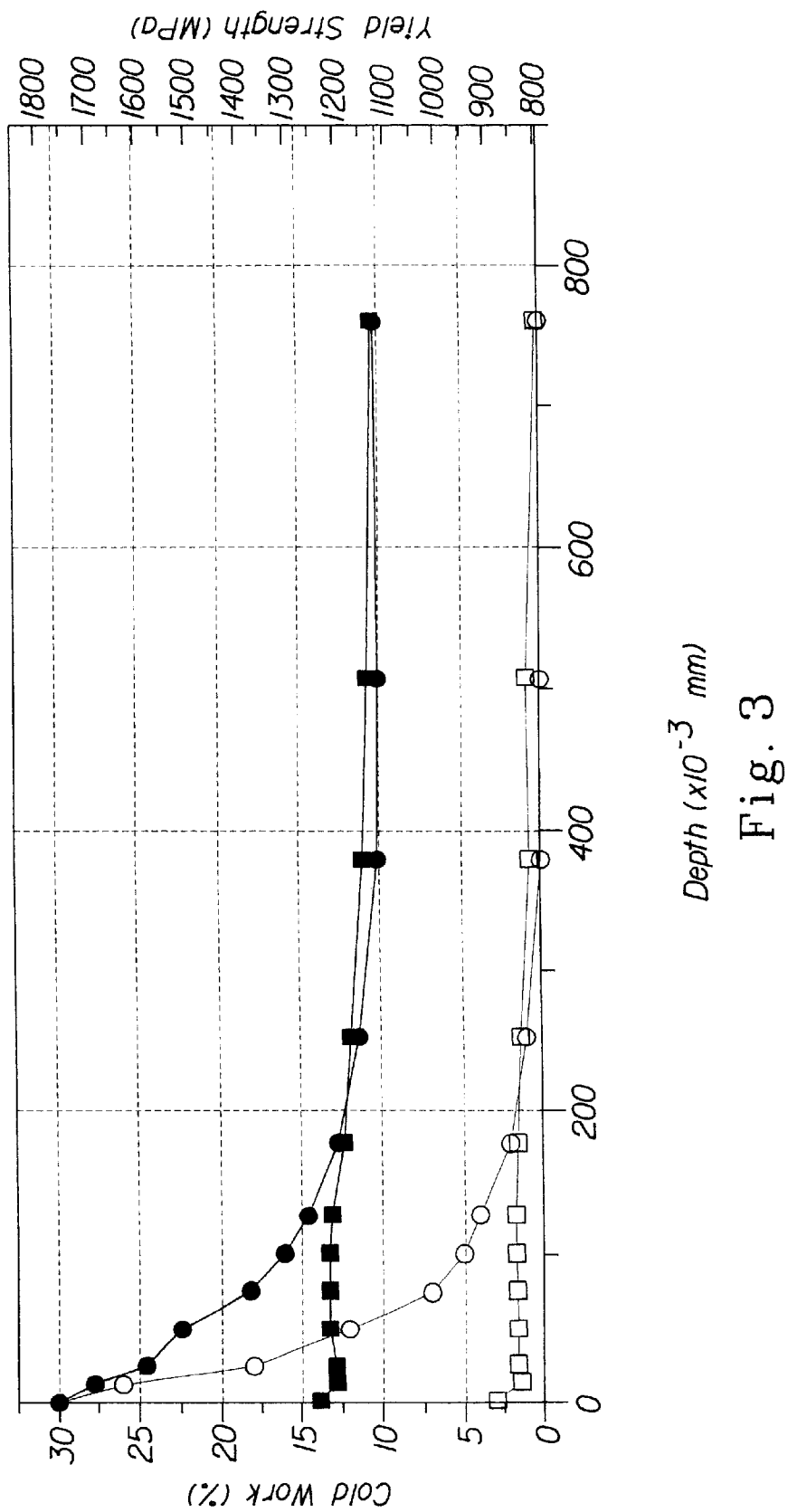
FIG. 3 is a graph illustrating the percent of cold work and yield strength distribution of a part having been treated by the method of shot peening and a part having been treated by the method of burnishing.

It has been found that for parts having a surface that has been substantially cold worked, such as a rotor disk for turbo machinery that has been treated by the process of shot peening, the cold worked compressive surface material will typically not yield in tension, such as during high speed operation, while the lower yield strength interior material will yield. On unloading of the part, such as when the speed of revolution of the rotor disk slows, the surface of the part is driven into tension and will remain in tension, reducing the fatigue life, throughout the parts remaining life. Referring to FIG. 2, the inversion into tension of a surface of a part having been treated by the method of shot peening is shown compared to a surface of a part having been treated by the method of burnishing, each having a 2.1% plastic strain single cycle. Referring to FIG. 3, the corresponding percent of cold work and yield strength distribution are shown. As illustrated, upon unloading, the part that underwent the method of shot peening may actually invert from compression into a relative high level of tension, if a yield strength gradient exists, thereby significantly reducing the fatigue life of the part.

Accordingly, it has been found that the preferred method of the present invention for improving the surface finish, fatigue life, and stress corrosion resistance of a part is burnishing, whereby a rotary or sliding member is pressed against the surface of the part in order to compress the microscopic peaks in the surface into adjacent hollows. Such compression develops compressive stresses within the part by yielding the surface in tension so that it returns to a state of compression following deformation. As shown in U.S. Pat. No. 5,826,435, by the same inventor and incorporated herein by reference, by cold working the surface less than about 3.5%, and preferably less than about 2.0%, results in layer retention of compressive residual stress at elevated temperature, less rapid relaxation under cyclic loading, and minimizes the alteration of the residual stress field during tensile or compressive overload than conventional cold working and surface hardening processes. Accordingly, the method of the present invention is shown in FIG. 1 and preferably utilizes the process of burnishing to provide deep compression with a minimal amount of cold working and surface hardening. In particular, the region to be burnished along the surface of the part is first defined and a burnishing apparatus having a single-point of contact burnishing member is pressed against the surface of the part to create a zone of deformation producing a relatively deep layer of compression within the surface. The burnishing member is then passed in a predetermined pattern across the region. Preferably, the pattern of burnishing is such that the zones of deformation formed by each pass of the burnishing member do not overlap. As disclosed in U.S. Pat. No. 5,826,435, applying a single-pass, or multiple passes having a reduced compressive pressure, produces compressive residual stresses following tensile deformation of the surface having deep compression with minimal cold working.

In another preferred embodiment of the invention, the method further comprises the steps of determining the optimum magnitude of compression to be induced at particular points along the surface of the selected region by controlling the pressure being exerted by the burnishing member. In another preferred embodiment of the invention, the method comprises the steps of varying the pattern of burnishing to produce a desired residual stress distribution. In another preferred embodiment of the invention, the method further comprises the steps of programming a control unit, such as a computer or numerical controller, to automatically regulate the burnishing force being applied to the burnishing member thereby controlling the pressure being exerted against the surface of the part and the corresponding magnitude of compression being induced by the burnishing apparatus. The control unit may also be programmed to control the direction of movement of the burnishing apparatus to produce the desired residual stress distribution.

The particular pressure and the pattern of burnishing for a part may be selected whereby the magnitude of compression and the residual stress distribution optimizes the fatigue performance of the part. For illustration, as shown in FIG. 4, a rectangular burnishing region is selected and the burnishing member is pressed against the surface of the part in a particular (raster) pattern, as shown by the arrow indicating the path of the burnishing member. The normal force (Fz) being applied to the burnishing member is varied to increase or decrease the pressure being exerted against the surface of the part. While FIG. 4 shows a linear variation in the normal force and the corresponding pressure being applied against the surface, parallel (X-direction) and perpendicular (Y-direction) to the direction of burnishing, it should now be apparent to those skilled in the art that the pattern of burnishing and the form and rate of reduction or increase in pressure being exerted against the surface can be controlled to provide a wide variety of residual stress distributions and magnitude of compression.

Referring to FIG. 5, another illustration of the method of the present invention is shown whereby variations in residual stress distribution may also be achieved by varying the pattern of burnishing, independently or in conjunction with variations in burnishing pressure. As shown, the spacing along the X-direction, perpendicular to the direction of travel of the burnishing member, has been varied to increase and decrease the spacing between each pass of the burnishing member thereby changing the the density (Dx) of burnishing (spacing density). As shown, the spacing between each pass of the burnishing member varies linearly, however, it should now be apparent to those skilled in the art that other burnishing patterns may be selected to produce the desired residual stress distribution.

Referring to FIG. 6, another pattern of burnishing is shown whereby the density of burnishing (Dx) is varied in two dimensions (X and Y directions) as a function of the length of the burnishing pass, in order to produce the desired stress distribution for the part being burnished.

Referring to FIG. 7, another pattern of burnishing is shown whereby a region is designated and the magnitude of compression and the residual stress distribution is selected that optimizes the fatigue performance of the part. As shown, the residual stress distribution has a symmetrical pattern such as what would be preferred for use around bolt holes or for "feathering" in a state of compressive stress in the fillet area of a rotor disk. It should now be apparent to those skilled in the art that the burnishing pressure, the density of burnishing, and the pattern of burnishing can be varied to produce the desired residual stress distribution and magnitude of compression for a part for a specific engineering application.

In addition, it is know that introducing a region of high compressive residual stress requires tensile stresses to exist elsewhere in the part to achieve equilibrium. Unfortunately, sharp surface demarcation or discontinuities typically exists along the boundaries of the burnished area and, depending upon the geometry and stress filed, tensile residual stress zones or concentrations often form along such boundaries. Such stress zones can significantly reduce the fatigue life of the part. It has been found that gradually reducing the pressure being exerted by the burnishing member to reduce the magnitude of compression in the direction towards the boundaries ("feathering") will reduce the build up of such tensile residual stress. Further, it has been found that by controlling the compressive residual stress distribution and the magnitude of compression, the tensile stress distributions within a part may be offset or distributed in such a manner as to optimize the fatigue and/or stress corrosion performance of the part.

The method for inducing a layer of compressive residual stress along the surface of a part and the apparatus for implementing the method provides control of the particular stress distribution and magnitude of compression that optimizes the fatigue performance of the part. By controlling the pattern of burnishing, such as the density of burnishing, and by gradually reducing the magnitude of compression near the boundaries of the regions being burnished ("feathering"), the tensile stress zones which occur immediately adjacent and parallel to the boundaries of the regions being treated may be reduced or eliminated.

Figure 8:
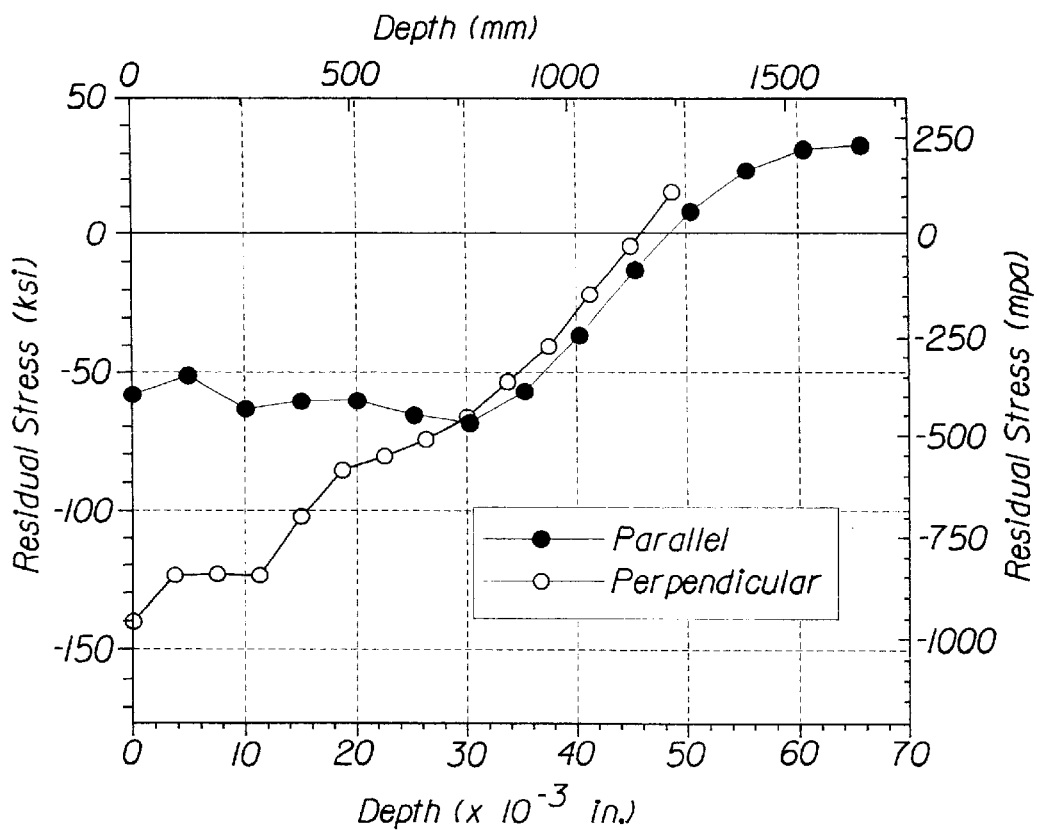
FIG. 8 is a graph illustrating the residual stress distribution induced in the surface of a part in the direction of burnishing (parallel) and in the transverse direction (perpendicular)
Figure 9:
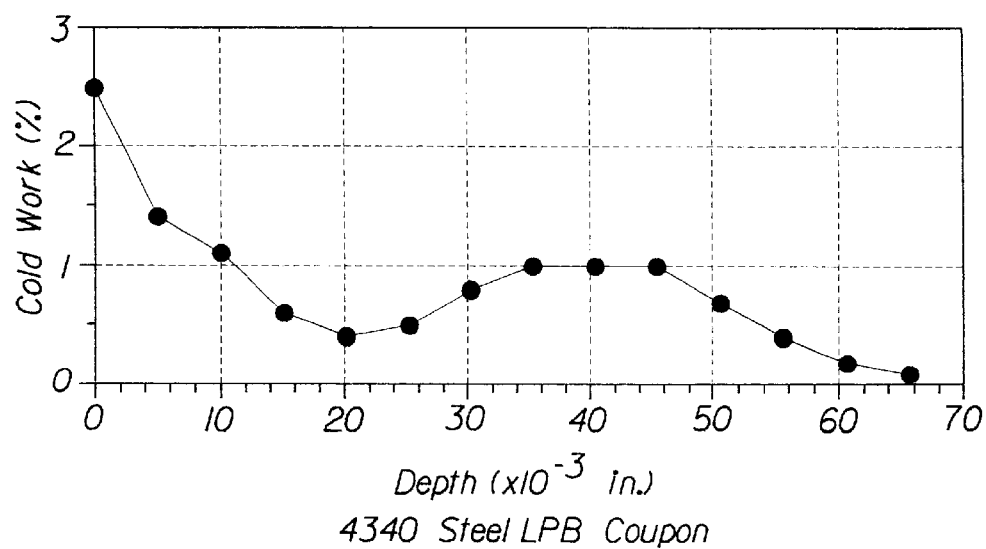
FIG. 9 is a graph illustrating the percent cold work distribution for the burnishing operation shown in FIG. 8.

In another preferred embodiment of the invention, the method of inducing a layer of compressive residual stress along the surface of a part includes the step of using a secondary process, such as shot peening, grit blasting, tumbling or other similar abrasive impact processes to induce a shallow layer of compressive residual stress near the surface of the part following burnishing. As shown in FIGS. 8 and 9, burnishing of a surface inherently produces a Hertzian loading of the surface resulting in maximum compression beneath the surface of the work piece. The residual stress at the surface can be near zero or even tensile, and is a function of the direction of the burnishing operation. The surface residual stress is typically less compressive in the direction of burnishing (parallel) than in the transverse direction (perpendicular) due to the effect of displacement of material laterally during passage of the burnishing member. The presence of lower compression at the surface has been found to allow the initiation of fatigue cracks at the surface of the part. Although these cracks are arrested as they propagate deeper into the more highly compressive material, the presence of surface cracks and the stress intensity factor associated with them is highly undesirable. It has been found that the method of this invention comprising the steps of burnishing a part in combination with the secondary process identified herein above provides surface compression as well as deep compression resulting in a part having superior resistance to surface crack initiation and propagation. In another embodiment of the invention, the method of the present invention comprises the step, in conjunction with the first step of burnishing, of removing a layer of low compression by electropolishing, etching or other similar means that will not induce a state of stress or through mechanical means, such as low stress grinding, polishing, tumbling, or other such means, which will induce a state of shallow compressive stress.

Figure 10:
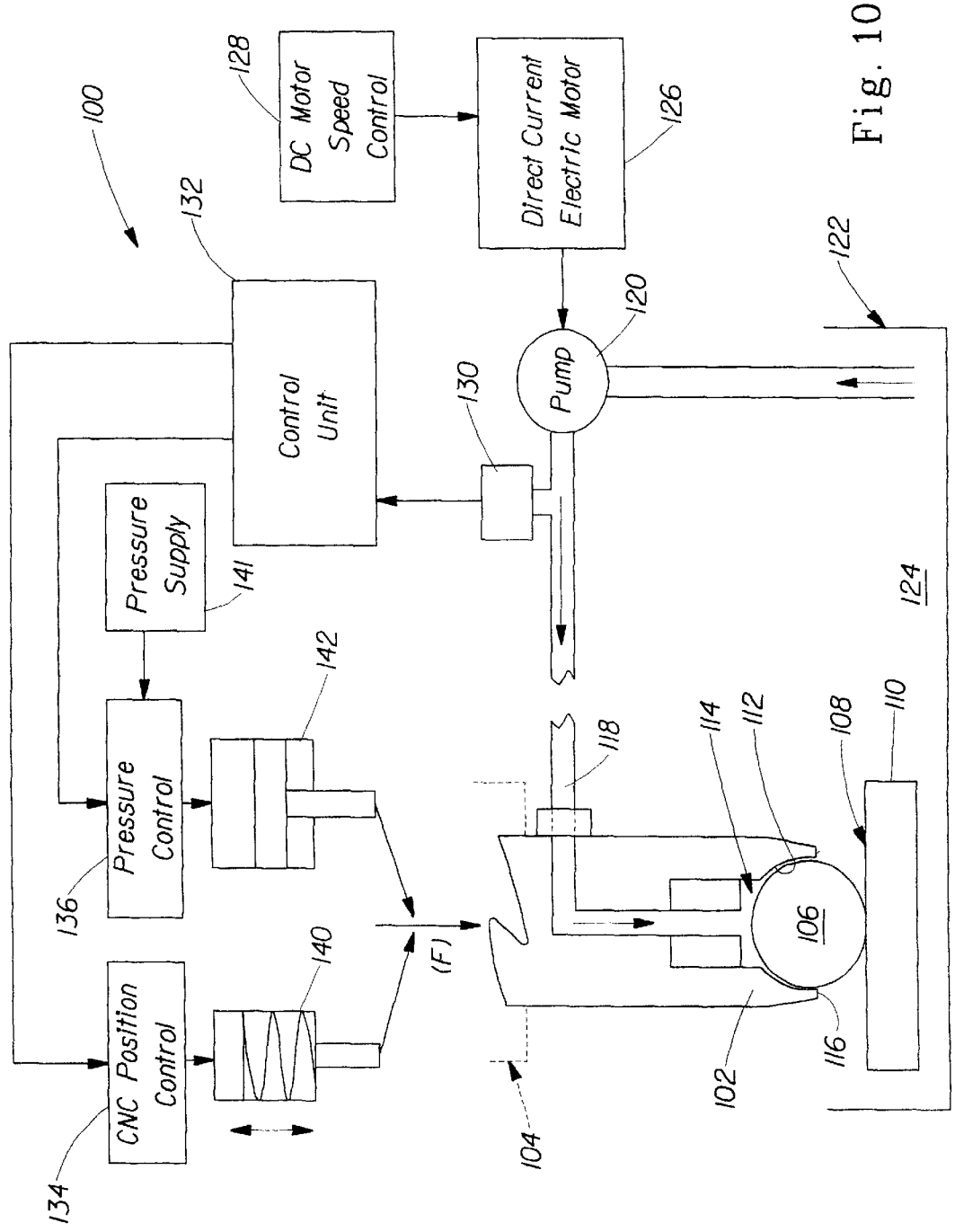
FIG. 10 is a diagrammatic view of the burnishing apparatus for implementing the method of the present invention.

Referring to FIG. 10, a preferred embodiment of the burnishing apparatus 100 for implementing the burnishing method of the subject invention is shown comprising a generally cylindrical socket 102 which conventionally mounts to a support 104 of any particular description typically used for supporting burnishing tools which is attached to a conventional machine tool fixture (not shown). In a preferred embodiment of the invention, the support 104 is coupled to the socket 102 and provides means for imparting a normal force F to a burnishing member 106 to effect the proper burnishing pressure sufficient to deform the surface 108 of the part 110.

The socket 102 includes a seat 112 adapted to the surface of the burnishing member 106 which is disposed within the seat 112, and an inner chamber 114. The size of the seat 112 is determined by the size and shape of the burnishing member 106 and is selected to provide a small clearance 116 between the seat 112 and the burnishing member 106. As shown, the support 104, in cooperation with the machine tool fixture, is adapted for controlling the movement of the socket 102 and includes means for forcing the socket 102 and the burnishing member 106 against the surface 108 of the part 110 being burnished. Without departing from the invention, it should now be apparent to those skilled in the art that various apparatus may be constructed to allow the socket to be moved to various positions or to allow the part being treated to rotate or pass in contact with the burnishing member in such a way that the selected region is burnished using the method of the present invention.

The socket 102 is further provided with a fluid passage 118 in flow communication with the seat 112 and extends from the seat 112 through the inner chamber 114 to a fitting (not shown) for connecting to a positive displacement pump 120 for providing a constant volumetric flow of fluid from a fluid supply 122 to the seat 112. The fluid supply 122 may be an external supply (not shown) or may be in the form of a sump 124, as shown, thereby forming a closed-loop fluid system. The positive displacement pump 120 is preferably coupled to a direct current (DC) electric motor 126 and a fast acting motor speed control 128. The motor speed control 128 functions to maintain a constant angular velocity of the motor 126 to sustain the constant volumetric fluid flow to the socket 102 regardless of any changes in fluid pressure. A pressure sensor 130, such as a pressure transducer, is connected to the fluid passage 118 for monitoring fluid pressure and is coupled to a control unit 132, such as a computer or a numerical controller, which is also coupled to either a position regulator 134, such as a spring, or a pressure regulator 136, such as a hydraulic or pneumatic system, that operate with the burnishing member 106 to provide the proper burnishing pressure being exerted against the surface 108 of the part 110.

To understand how the elements of this invention described are interrelated, the operation of the burnishing apparatus 100 will now be described. During operation, fluid, such as a lubricating fluid, is fed under pressure from the fluid supply 122 by use of the positive displacement pump 120 through the fluid passage 118 and into the inner chamber 114. The fluid in the inner chamber 114 is then fed under pressure around the burnishing member 106 through clearance 116 to force the burnishing member 106 outwardly. The lubricating fluid flows around the outer surface of the burnishing member 106 to permit the burnishing member 106 to float continuously upon a thin film of fluid. The socket 102 is then advanced towards the surface 108 of the part 110 by operation of the support and the machine tool fixture (not shown) until the forward most portion of the burnishing member 106 makes contact with the surface 108. By further adjusting the speed of the motor, a desired amount of lubrication fluid will flow around the burnishing member 106 and be transferred onto the surface 108 of the part 110 to provide the desired lubrication and cooling for the burnishing operation. During burnishing, the further most portion of the burnishing member 106 contacts the surface 108 of the part 110 causing the burnishing member 106 to move inwardly into the socket 102 thereby reducing the clearance 116 between the burnishing member 106 and the socket 102 thereby increasing the pressure of the fluid in the fluid passage 118. The increase in fluid pressure is detected by the pressure sensor 130 which is coupled to the control unit 132 that functions to adjust the force F being applied to the burnishing member 106 to maintain a constant or controlled variable burnishing pressure against the surface 108. It should now be apparent to those skilled in the art that the constant flow burnishing apparatus 100 of the present invention, unlike conventional constant pressure burnishing apparatus that follow the surface topography of the part, automatically increases the force F being applied to the burnishing member 106, and the corresponding pressure being exerted against the surface 108, on high points and decreases on low points along the surface 108. Accordingly, the pressure or the compressive force exerted on the surface 108 of the part 110 by the burnishing member 106 can be precisely regulated to provide optimum surface finish and uniform burnishing of the part.

In a preferred embodiment of the invention, the proper pressure or compressive force to be applied to the surface 108 of the part 110 during the burnishing operation is provided by using the position regulator 134 whereby the force F being applied to the burnishing member 106 is a function of the position of the socket 102. As shown, the position regulator 134 includes a spring means 140, such as a coil spring, deflection members, or Belleville washers, having a known spring characteristic, which compresses or expands axially to apply a given normal force F to the burnishing member 106. Because the burnishing member 106 is coupled through the spring means 140, the force F being applied to the burnishing member 106 and the resulting pressure being exerted on the surface 108 of the part 110 can be accurately controlled by positioning (moving) the socket 102 using the conventional machine tool fixture (not shown). The control unit 132 operates with a feed back signal from the pressure sensor 130 to achieve closed loop control of the force F and the corresponding pressure being exerted on the surface by the burnishing member 106.

Preferably the machine tool fixture supporting the socket 102 is a "three-axis" machine that provides for linear motion along mutually orthogonal axis of a fixed coordinate system.

It should now be apparent to those skilled in the art that by using a programmable control unit 132 which is configured to continuously track the position of the burnishing member 106, the socket 102 can be accurately positioned and moved in a selected pattern. Further, in combination with passing the burnishing member is a selected pattern across the surface of the part, the pressure being exerted against the surface may be varied to obtain a region having the desired residual stress distribution and magnitude of compression.

In another preferred embodiment of the invention, the proper pressure or compressive force to be applied to the surface 108 of the part 110 during the burnishing operation is provided by use of the pressure regulator 136. As shown in FIG. 10, the pressure regulator.136 comprises a source of pressurized fluid 141 for providing pneumatic or hydraulic pressure against a piston 142, diaphragm or other similar means. The piston 142 is coupled to the burnishing member 106 in such a manner that movement of the piston 142 operates to increase or decrease the force F being applied to the burnishing member 106 thereby increasing or decreasing the corresponding pressure being exerted by the burnishing member 106 on the surface 108 of the part 110. In operation, for constant pressure burnishing, the machine tool fixture moves the socket 102 in a predetermined pattern along the surface 108 of the part 110. The control unit 132 functions with a feed back signal from the pressure sensor 130 to achieve closed loop control of the force F and the corresponding pressure being exerted on the surface 108 by the burnishing member 106. It should now be apparent to those skilled in the art that by using the control unit 132, the burnishing member 106 can be accurately moved in a selected pattern while exerting a predetermined pressure against the surface 108 of the part 110 to obtain a region having the desired residual stress distribution and magnitude of compression.

Conventional constant pressure burnishing apparatus require a containment means, such as end caps, for maintaining the burnishing member withing the apparatus. The containment means must be capable of withstanding high pressure and forces, including the time when the burnishing member is not in contact with the surface of the part. In the event that the containment means fails, the burnishing member could be propelled from the burnishing apparatus at high velocity. In contrast, the constant flow burnishing apparatus of the subject invention eliminates the need of a containment means that is capable of withstanding high pressure.

Figure 11:
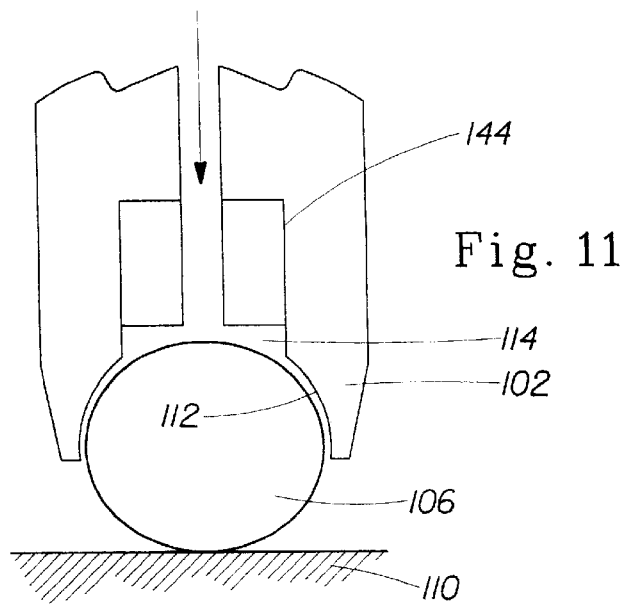
FIG. 11 is a diagrammatic view of the socket of a preferred embodiment of the burnishing apparatus of the present invention showing magnetic means for maintaining the burnishing member within the socket.
Figure 12:
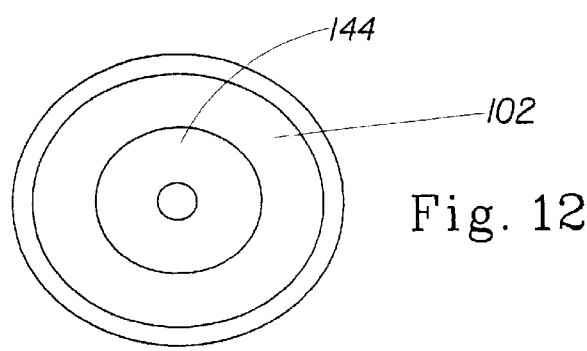
FIG. 12 is a bottom diagrammatic view of the socket of FIG. 11 with the burnishing member removed.
Figure 13:
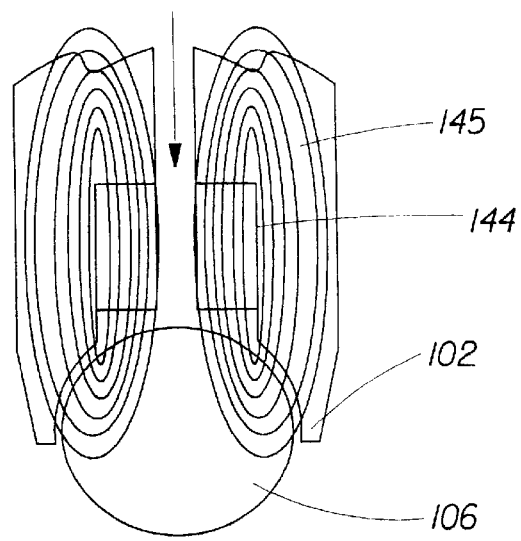
FIG. 13 is a diagrammatic view of the socket of FIG. 11 showing the magnetic field lines for maintaining the burnishing member within the socket.

Referring to FIGS. 11, 12 and 13, the burnishing member 106 may be selected from various materials having a higher yield strength than the part 110 being burnished and having a relatively high elastic modules to allow maximal deformation of the part 110. In a preferred embodiment of the invention, the burnishing member 106 is formed from a high carbon steel or a sintered tungsten carbide containing a portion of a cobalt binder. The inner chamber 114 of the socket 102 is shown having a magnetic means 144, such as a permanent magnet or an electric magnet or the like, which produce magnetic flux 145 (FIG. 13) that functions to maintain the burnishing member 106 withing the seat 112. It has been found that forming the socket 102 from a ferromagnetic alloy, such as a martensitic stainless steel AISI 440C, the socket 102 functions as a pole piece thereby increasing the holding power of the magnet means 144. Because the bearing member 106 is supported by a low volume of fluid having a constant flow rate, the bearing member 106 will be retained within the socket 102 even while the fluid is flowing and the socket 102 is being repositioned or moved out of contact with the surface 108 of the part 110.

Figure 14:
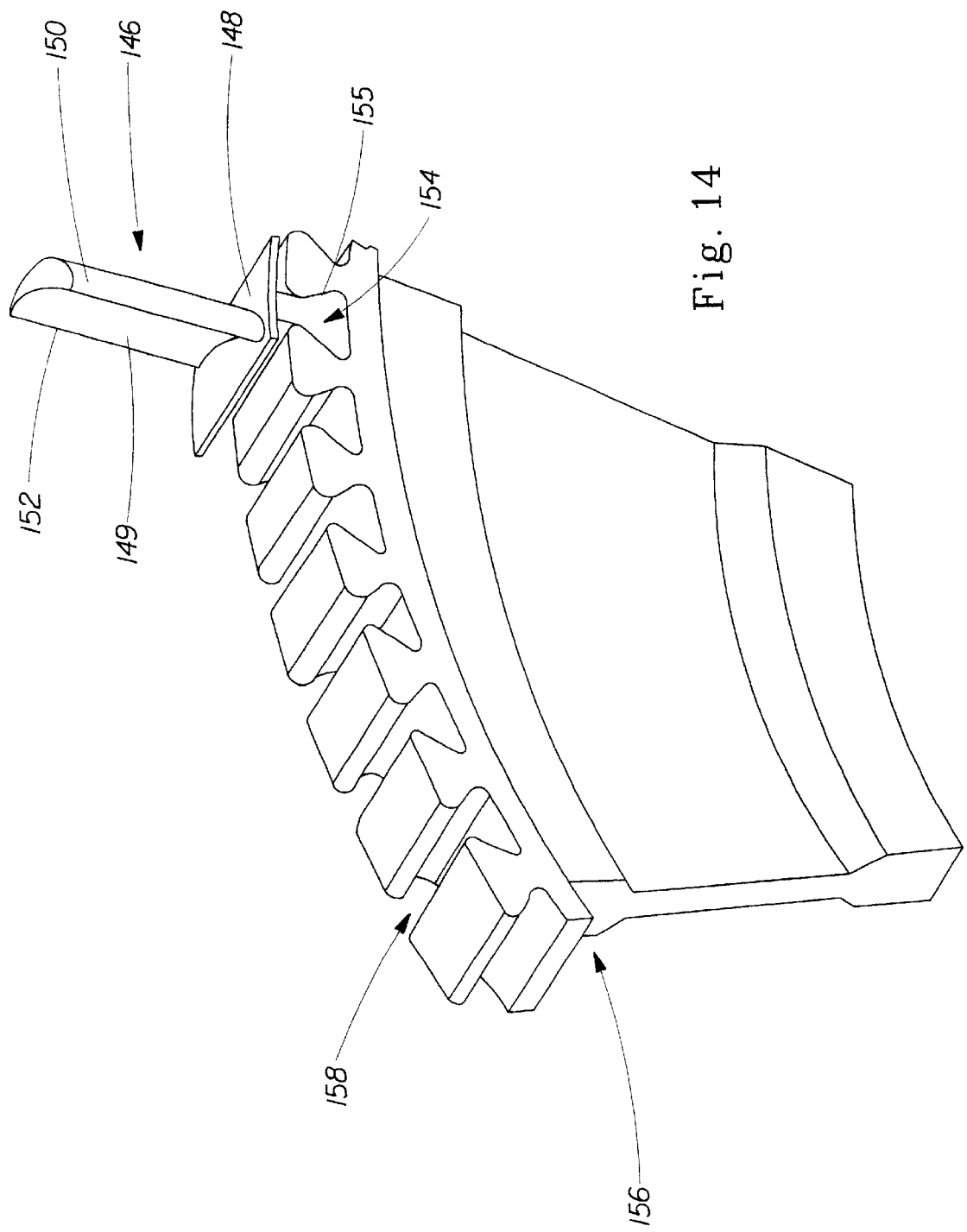
FIG. 14 is a partial perspective view of a blade and a rotor disk of the present invention.

Referring to FIG. 14, a blade of the present invention is shown, for use in turbo machinery. The blade 146 includes a generally rectangular platform 148; an elongated airfoil 149 having a leading edge 150 and a trailing edge 152, the airfoil 149 being rigidly attached to and extending radially outwardly from the platform 148; and a root 154 rigidly connected to and extending radially inwardly from the platform 148 having a dovetail portion 155 for mounting to a rotor disk 156. As used herein, the term "outwardly" refers to the direction away from the center of rotation of the blade and rotor disk and the term "inwardly" refers to the direction towards the center of rotation of the blade and rotor disk. The rotor disk 156 includes a plurality of circumferentially spaced axially disposed slots 158 therein. The blade 146 is attached to the rotor disk 156 by inserting the root 154 into a slot 158. As shown, the root 154 and the slot 158 have complementing surfaces for securing the blade 146 to the rotor disk 156. During operation, the rotor disk 156 and the attached blades 146 are subjected to high centrifugal loads that produce high dynamic stresses that may cause high cycle fatigue along portions of the rotor disk 156 and each blade 146. Further, the leading edge 150 of the blade 146 is often subjected to damage by the impact of foreign objects in the fluid stream.

In a preferred embodiment of the invention, the blade 146 is treated by the method comprising a step or a combination of steps disclosed herein. In another preferred embodiment of the invention, the rotor disk 156 is treated by the method comprising a step or a combination of steps disclosed herein.

Another preferred embodiment of the invention, a part is selected from the group comprising automotive parts, aircraft parts, marine parts, engine parts, motor parts, machine parts, drilling parts, construction parts, pump parts, and the like treated by the method comprising the step, or a combination of steps, of the present invention.

The method and apparatus for implementing the method of the subject invention utilizes a burnishing method that produces cold work and surface work hardening far less than either conventional shot peening, gravity peening, and conventional burnishing or deep rolling methods. The increase in residual compressive stress with minimal cold work developed by the subject invention penetrates to a greater depth than most conventional methods, such as shot peening and results in longer retention of compressive residual stress at elevated temperature, less rapid relaxation under cyclic loading, and minimizes the alteration of the residual stress field during tensile or compressive overload, than conventional cold working and surface hardening processes. Accordingly, the method and apparatus for implementing the method of the subject invention provides a relatively inexpensive and effective means of providing a compression force on a workpiece to induce compressive residual stress in a well defined localized region of a simple or complex part surface configuration with a minimum of cold working and surface hardening. By minimizing the amount of cold working and surface hardening, the method of the subject invention produces longer retention of compressive residual stress at elevated temperature, less relaxation under cyclic loading, and minimizes the alteration of the residual stress field during tensile or compressive overload. Further, the method and the apparatus of the invention for inducing a layer of compressive residual stress along the surface of the part permits a variety of burnishing patterns to be designated to produce regions of residual stress that are appropriate for a specific engineering application. In addition, a part treated using the method of the invention have improved stress corrosion cracking resistance.

While the method and apparatus described constitute preferred embodiments of the invention, it is to be understood that the invention is not limited to the precise method and apparatus, and that changes may be made therein without departing from the scope of the invention which is defined in the appended claims.

What is claimed is:

1. A method of reducing zones of high tensile stress in the surface of a part comprising the steps of:

selecting a region of the part to be treated; and exerting a variable pressure against the surface of the selected region, the pressure being applied such that the magnitude of compression decreases in the direction towards the boundaries of the selected region to minimize the effects of any tensile stress zones near the boundaries.

2. The method of claim 1 wherein the pressure being exerted against the surface of the part is performed by a burnishing operation.

3. The method of claim 2 wherein the burnishing operation includes varying the burnishing density along the boundaries of the selected region.

4. The method of claim 1 wherein said pressure being exerted on the surface of the part induces a deep layer of compression within the surface having associated cold working of less than about 5.0 percent.

5. The method of claim 1 wherein said pressure being exerted on the surface of the part induces a deep layer of compression within the surface having associated cold working of less than about 3.5 percent.

6. The method of claim 1 further wherein the step of selecting the magnitude of compression includes the step of programming a control unit to automatically reduce the magnitude of compression in the direction towards the boundaries of the selected region.

7. The method of claim 1 wherein the step of exerting pressure against the surface of the selected region includes the step of programming a control unit to control the application of said pressure.

8. The method of claim 1 wherein the part is selected from the group consisting of automotive parts, aircraft parts, marine parts, engine parts, motor parts, machine parts, drilling parts, construction parts, and pump parts.

9. A method of reducing high tensile stress zones in the surface of a part comprising the steps of:

selecting a region of the part to be treated; and programming a control unit of a burnishing apparatus to perform a burnishing operation, the burnishing operation being performed such that the density of burnishing, the magnitude of compression, and the pressure being applied against the surface are varied to reduce the high tensile stress zones along the boundaries of the selected region.

10. The method of claim 9 wherein said burnishing operation induces a deep layer of compression within the surface having associated cold working of less than about 5.0 percent.

11. The method of claim 9 wherein said burnishing operation induces a deep layer of compression within the surface having associated cold working of less than about 3.5 percent.

* * * * *

UNITED STATES PATENT AND TRADEMARK OFFICE
CERTIFICATE OF CORRECTION

| | | |
|---|---|---|
| PATENT NO. | : 6,622,570 B1 | Page 1 of 2 |
| APPLICATION NO. | : 09/516327 | |
| DATED | : September 23, 2003 | |
| INVENTOR(S) | : Paul S Prevey, III | |

It is certified that error appears in the above-identified patent and that said Letters Patent is hereby corrected as shown below:

Replace text from Column 13, line 30 through Column 14, line 43 as follows:

1. (Currently amended) A method of reducing zones of high tensile stress in the surface of a part comprising the steps of:

selecting a region of the part to be treated; and exerting a controlled variable pressure against the surface of the selected region, wherein the pressure being applied is precisely and constantly regulated by monitoring the pressure at every position of the selected region such that the magnitude of compression decreases in the direction towards the boundaries of the selected region in a controlled manner to minimize the effects of any tensile stress zones near the boundaries.

2. (Original) The method of claim 1 wherein the pressure being exerted against the surface of the part is performed by a burnishing operation.

3. (Previously Amended) The method of claim 2 wherein the burnishing operation includes varying the burnishing density to modify the magnitude of compression in the selected region.

4. (Original) The method of claim 1 wherein said pressure being exerted on the surface of the part induces a deep layer of compression within the surface having associated cold working of less than about 5.0 percent.

Signed and Sealed this
Twenty-eighth Day of August, 2012

David J. Kappos
*Director of the United States Patent and Trademark Office*

Con't 5. (Original) The method of claim 1 wherein said pressure being exerted on the surface of the part induces a deep layer of compression within the surface having associated cold working of less than about 3.5 percent.

6. (Previously Amended) The method of claim 1 wherein the step of selecting the magnitude of compression includes the step of programming a control unit to automatically reduce the magnitude of compression in the direction towards the boundaries of the selected region in a controlled manner.

7. (Previously Amended) The method of claim 1 wherein the step of exerting controlled variable pressure against the surface of the selected region includes the step of programming a control unit to control the application of said controlled variable pressure.

8. (Original) The method of claim 1 wherein the part is selected from the group consisting of automotive parts, aircraft parts, marine parts, engine parts, motor parts, machine parts, drilling parts, construction parts, and pump parts.

9. (Previously Amended) A method of reducing high tensile stress zones in the surface of a part comprising the steps of;
selecting a region of the part to be treated; and
programming a control unit of a burnishing apparatus to perform a burnishing operation, the burnishing operation being performed such that the density of burnishing, the magnitude of compression, and the pressure being applied against the surface are varied in a controlled manner to reduce the high tensile stress zones along the boundaries of the selected region.

10. (Original) The method of claim 9 wherein said burnishing operation induces a deep layer of compression within the surface having associated cold working of less than about 5.0 percent.

11. (Original) The method of claim 9 wherein said burnishing operation induces a deep layer of compression within the surface having associated cold working of less than about 3.5 percent.

(12) EX PARTE REEXAMINATION CERTIFICATE (6442nd)

United States Patent
Prevey, III

(10) Number: US 6,622,570 C1
(45) Certificate Issued: Sep. 16, 2008

(54) METHOD FOR REDUCING TENSILE STRESS ZONES IN THE SURFACE OF A PART

(75) Inventor: Paul S. Prevey, III, Cincinnati, OH (US)

(73) Assignee: Surface Technology Holdings, Ltd., Cincinnati, OH (US)

Reexamination Request:
No. 90/007,383, Jan. 18, 2005

Reexamination Certificate for:
Patent No.: 6,622,570
Issued: Sep. 23, 2003
Appl. No.: 09/516,327
Filed: Mar. 1, 2000

(51) Int. Cl.
*G01N 3/08* (2006.01)

(52) U.S. Cl. .............................. 73/826; 72/75
(58) Field of Classification Search .................. None
See application file for complete search history.

(56) References Cited

U.S. PATENT DOCUMENTS

| | | | |
|---|---|---|---|
| 4,947,668 A | 8/1990 | Ostertag | |
| 5,826,453 A * | 10/1998 | Prevey, III | 72/75 |
| 6,622,570 B1 | 9/2003 | Prevey, III | |

OTHER PUBLICATIONS

"Practical Metallurgy", 1940, pp. 121–123, George Sachs and Kent R. Van Horn, ASM.
"Application Description NR. AO–7088/IE Deep Rolling", Mar. 19, 1996, Ecoroll AG Werkzeugtechnik, Celle, Germany.
"Operating Instructions, No. 080592E/3, Hydrostatic Roller Burnishing Tool HG4–HG6–, HG13–9", Oct. 10, 1996, Ecoroll AG Werkzeugtechnik, Celle, Germany.
"Tools for Roller Burnishing, Deep Rolling, Forming", pp. 2.9–2.12 and 5.1, Apr. 1996, Ecoroll AG Werkzeugtechnik, Celle, Germany.

\* cited by examiner

*Primary Examiner*—Minh Nguyen

(57) ABSTRACT

The present invention is a novel method for reducing tensile zones in the surface of a part comprising the steps of selecting a region of the part to be treated and programming a control unit of a burnishing apparatus to perform a burnishing operation, the burnishing operation being performed such that the density of burnishing and the magnitude of compression are varied to reduce the high tensile stress along the boundaries of the selected region. In a preferred embodiment of the invention the burnishing operation induces a deep layer of compression within the surface having associated cold working of lens than about 5.0 percent.

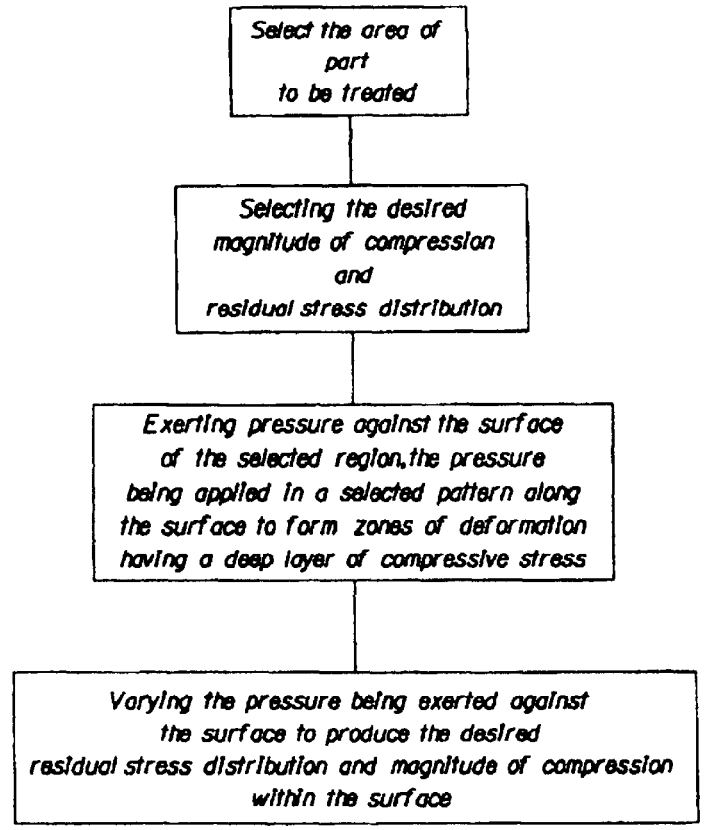

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 3, 6, 7 and 9 are determined to be patentable as amended.

Claims 2, 4, 5, 8 and 10–11, dependent on an amended claim, are determined to be patentable.

1. A method of reducing zones of high tensile stress in the surface of a part comprising the steps of:
    selecting a region of the part to be treated; and
    exerting a *controlled* variable pressure against the surface of the selected region, the pressure being applied such that the magnitude of compression decreases in the direction towards the boundaries of the selected region *in a controlled manner* to minimize the effects of any tensile stress zones near the boundaries.

3. The method of claim 2 wherein the burnishing operation includes varying the burnishing density *to modify the magnitude of compression* along the boundaries of the selected region.

6. The method of claim 1 [further] wherein the step of selecting the magnitude of compression includes the step of programming a control unit to automatically reduce the magnitude of compression in the direction towards the boundaries of the selected region *in a controlled manner*.

7. The method of claim 1 wherein the step of exerting *controlled variable* pressure against the surface of the selected region includes the step of programming a control unit to control the application of said *controlled variable* pressure.

9. A method of reducing high tensile stress zones in the surface of a part comprising the steps of:
    selecting a region of the part to be treated; and
    programming a control unit of a burnishing apparatus to perform a burnishing operation, the burnishing operation being performed such that the density of burnishing, the magnitude of compression, and the pressure being applied against the surface are varied *in a controlled manner* to reduce the high tensile stress zones along the boundaries of the selected region.

\* \* \* \* \*